US008480100B2

(12) United States Patent
Staggs

(10) Patent No.: US 8,480,100 B2
(45) Date of Patent: Jul. 9, 2013

(54) SHOWER CHAIR/WALKER COMBINATION

(76) Inventor: Gary M. Staggs, Colleyville, TX (US)

( * ) Notice: Subject to any disclaimer, the term of this patent is extended or adjusted under 35 U.S.C. 154(b) by 0 days.

(21) Appl. No.: 13/452,683

(22) Filed: Apr. 20, 2012

(65) Prior Publication Data

US 2012/0205882 A1 Aug. 16, 2012

Related U.S. Application Data

(63) Continuation-in-part of application No. 12/656,506, filed on Feb. 1, 2010, now abandoned.

(51) Int. Cl.
*B62M 1/00* (2010.01)

(52) U.S. Cl.
USPC .......................... 280/87.021; 280/657; 135/67

(58) Field of Classification Search
USPC ................. 280/87.01, 87.021, 87.041, 47.34, 280/657; 135/65, 66, 67; 297/311, 313, 337
See application file for complete search history.

(56) References Cited

U.S. PATENT DOCUMENTS

| | | | | |
|---|---|---|---|---|
| 3,512,187 | A * | 5/1970 | Thomas et al. | 4/240 |
| 5,608,925 | A * | 3/1997 | Porter | 4/480 |
| 5,904,168 | A * | 5/1999 | Alulyan | 135/65 |
| 6,338,493 | B1 * | 1/2002 | Wohlgemuth et al. | 280/30 |
| 6,371,142 | B1 * | 4/2002 | Battiston | 135/67 |
| 6,837,503 | B2 | 1/2005 | Chen et al. | |
| 7,179,200 | B1 * | 2/2007 | Wu | 482/51 |
| 7,837,208 | B2 * | 11/2010 | Willis | 280/87.021 |
| 2005/0211285 | A1 | 9/2005 | Cowie et al. | |
| 2007/0143910 | A1 * | 6/2007 | Lauffer | 4/234 |
| 2010/0031433 | A1 * | 2/2010 | Storm | 4/444 |
| 2010/0243011 | A1 * | 9/2010 | Lin | 135/66 |

* cited by examiner

*Primary Examiner* — John Walters
(74) *Attorney, Agent, or Firm* — Richard C. Litman

(57) ABSTRACT

The shower chair/walker combination incorporates the features of a walker and a shower chair into a single appliance. The appliance includes a folding walker having a pivoted seat thereon. The seat is of a split toilet seat design, having a gap at its front end. This feature allows a caregiver to have access to all parts of the patient's body to assure complete bathing. The appliance is provided with brakes and controls therefor, as is conventionally provided for walkers. All moving parts are either covered to prevent rusting or fabricated from rust-resistant materials.

5 Claims, 9 Drawing Sheets

SHOWER CHAIR/WALKER COMBINATION

CROSS-REFERENCE TO RELATED APPLICATION

This application is a continuation-in-part of U.S. patent application Ser. No. 12/656,506 filed Feb. 1, 2010 now abandoned.

BACKGROUND OF THE INVENTION

1. Field of the Invention

The present invention generally relates to medical appliances, and particularly to a shower chair/walker combination that provides a walker that is also usable as a shower chair for the disabled.

2. Description of the Related Art

In hospitals, nursing facilities and even in the private home, it is often necessary for a disabled and/or elderly patient to have a shower for adequate cleansing. Often, this endeavor requires the use of two appliances. One appliance (a walker or wheelchair) is needed to transport the patient to the shower area. A second appliance is needed to provide support while the patient is actually taking the shower. The use of walkers or wheelchairs for providing mobility for disabled people is a well-known concept in the related medical arts. So to is the use of shower chairs for people who find it difficult to stand while taking a shower. A variety of walkers, wheelchairs and shower chairs are disclosed in the related arts and are commercially available. It would certainly be advantageous if these appliances could be combined into a single appliance for accomplishing the task as described above. Thus, a shower chair/walker combination solving the aforementioned problems is desired.

SUMMARY OF THE INVENTION

The shower chair/walker combination incorporates the features of a walker, a shower chair and a toilet seat. The combination comprises a folding walker having a pivoted seat thereon. The seat is of a split toilet seat design having a gap at its front end. This feature allows a caregiver to have access to all parts of the patient's body to assure complete bathing. The appliance is provided with brakes and controls therefor as is conventionally provided for walkers. All moving parts are either covered to prevent rusting or fabricated from rust-resistant materials.

Accordingly, the invention presents a medical appliance that can be employed as a walker or a shower chair. The appliance is provided with wheels for easy movement. The appliance is also foldable to enhance storage capability. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
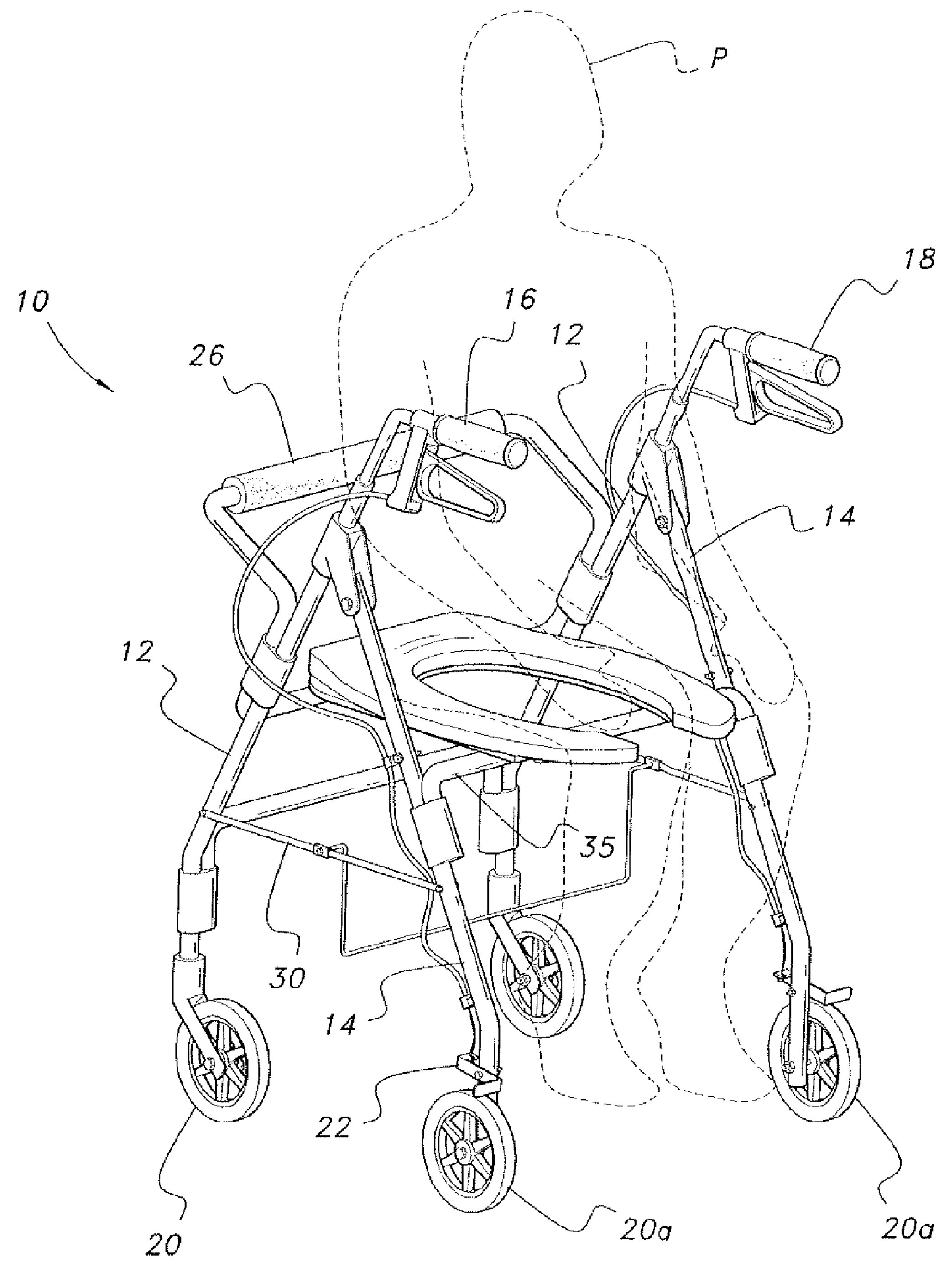
FIG. 1 is an environmental, perspective view of a first embodiment of a shower chair/walker combination according to the present invention.
Figure 2:
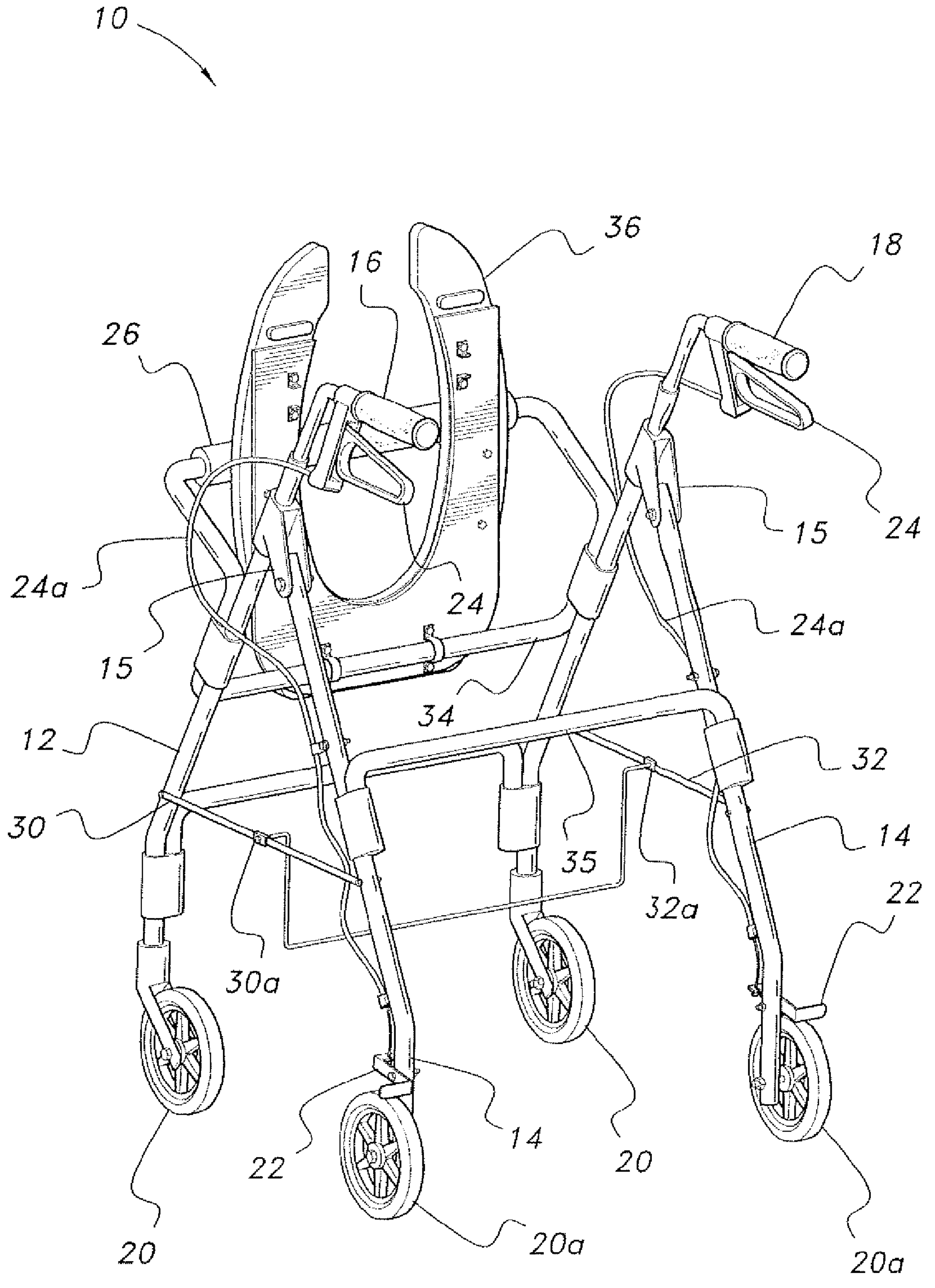
FIG. 2 is a perspective view of the shower chair/walker combination of FIG. 1.

Referring to FIGS. 1 and 2, the shower walker/chair 10 comprises a pair of tubular front frame members 12 and a pair of tubular rear frame members 14. Front frame members are pivotally attached to rear frame members 12 at pivot connections 15. First and second handle members 16 and 18 are disposed in front frame members 12 and are telescopically adjustable therein to accommodate patients of different heights. The lower ends of frame members 12 and 14 are provided with respective front casters 20 and rear casters *20a* to facilitate movement.

Braking elements 22 are positioned adjacent rear casters *20a*. Brake controls 24 are mounted on handle members 16 and 18 and function to operate braking elements 22 via control lines *24a*. A padded detachable backrest member 26 is mounted to front frame member 12 to enhance the comfort of the patient when seated. Side support members 30 and 32 are attached to the front and rear frame members to provide stability. Side support members 30 and 32 are hinged at their respective centers *30a* and *32a* to accommodate folding.

Figure 3:
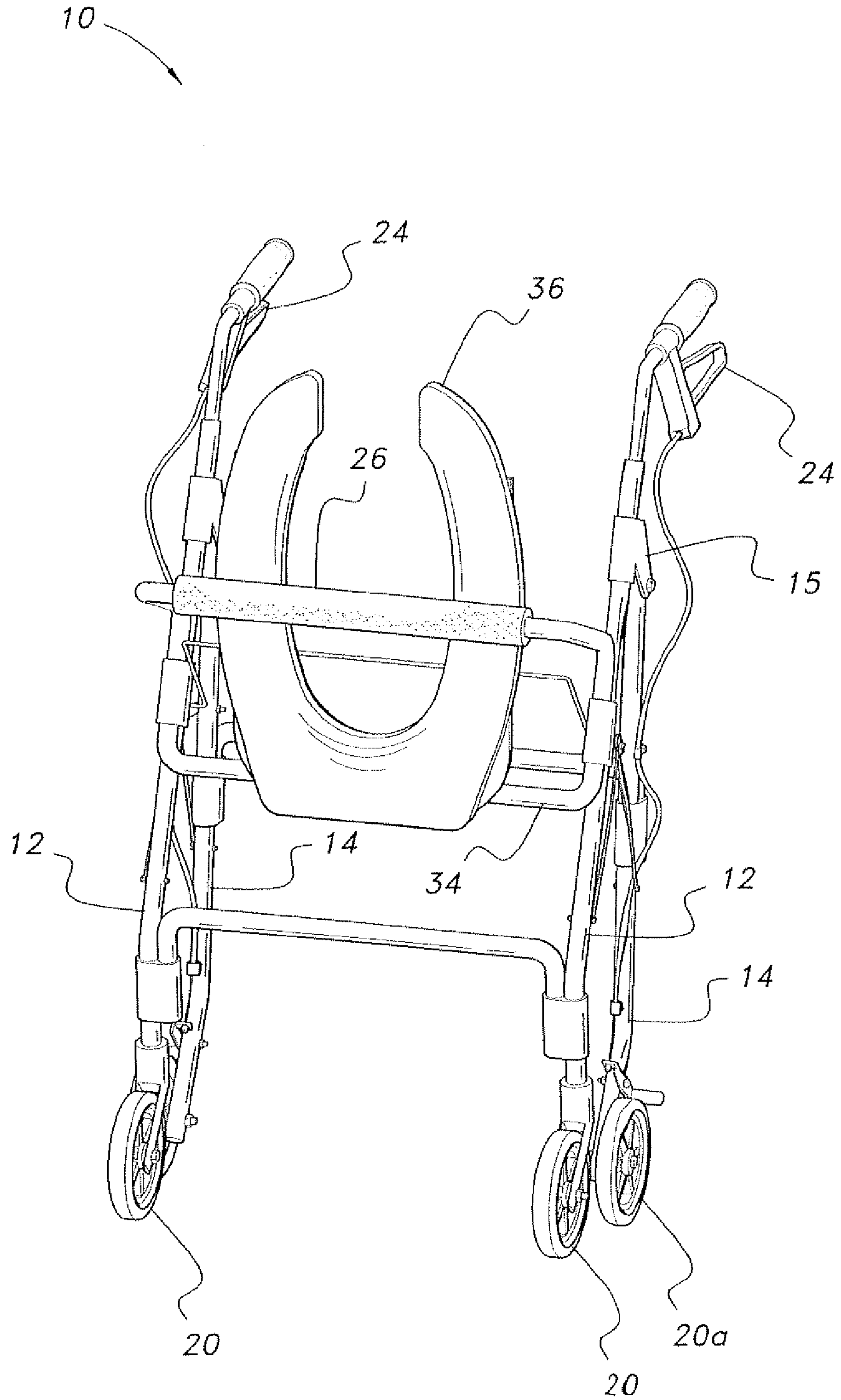
FIG. 3 is a perspective, rear view of the shower chair/walker combination of FIG. 1, shown in a folded position.
Figure 4:
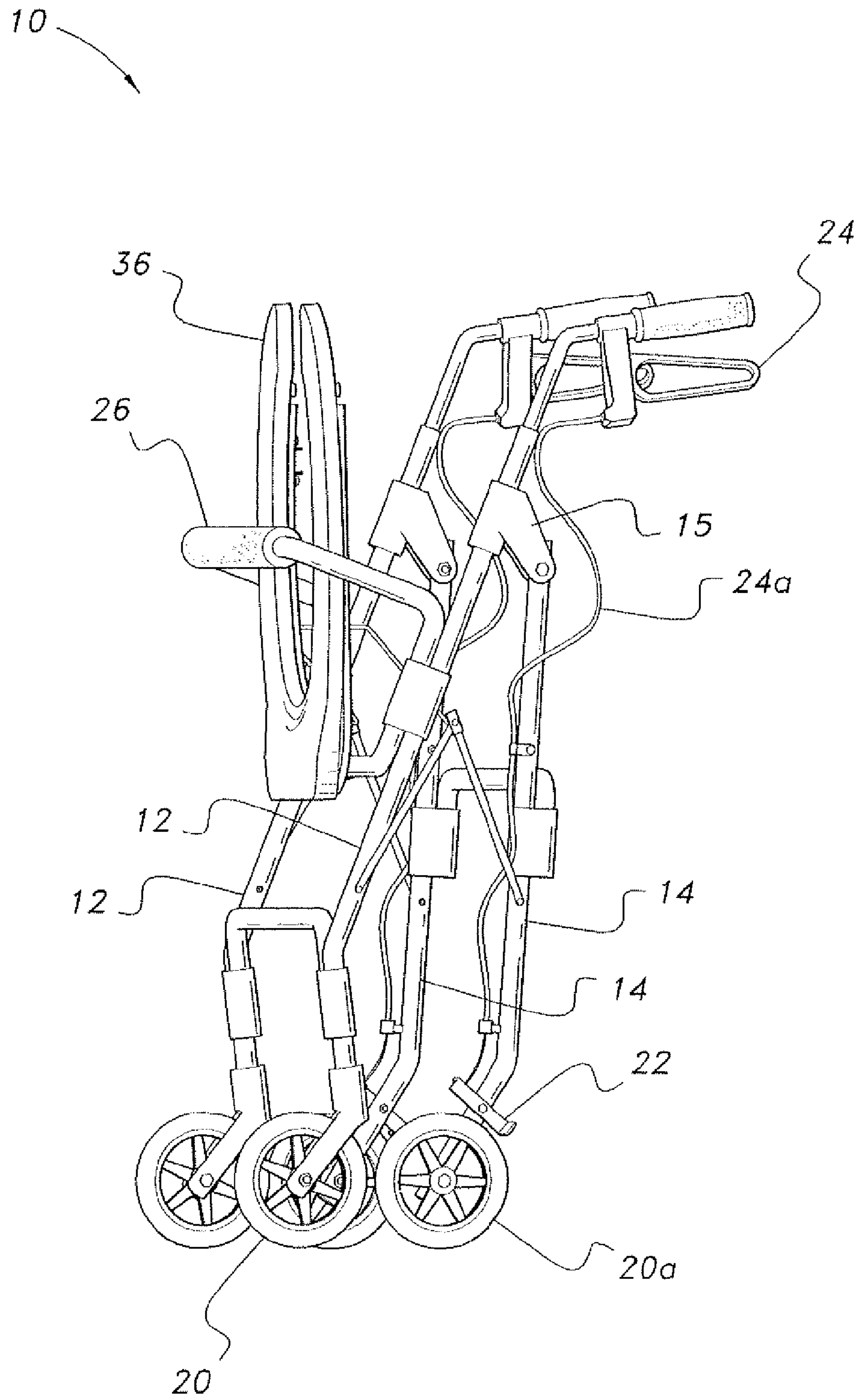
FIG. 4 is a perspective, side view of the shower chair/walker combination of FIG. 1, shown in a folded position.
Figure 5:
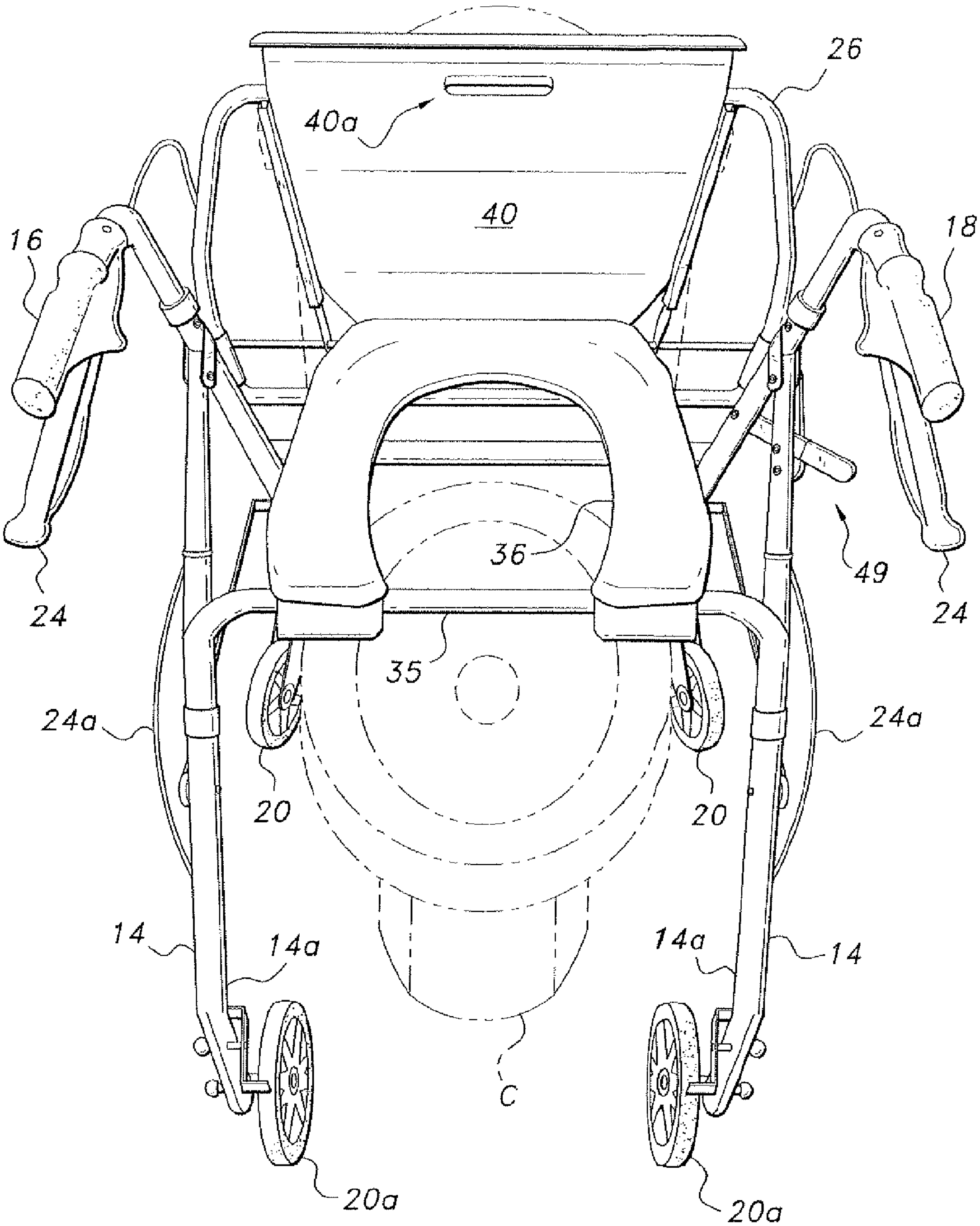
FIG. 5 is an environmental, perspective view of a second embodiment of a shower chair/walker combination according to the present invention.
Figure 6:
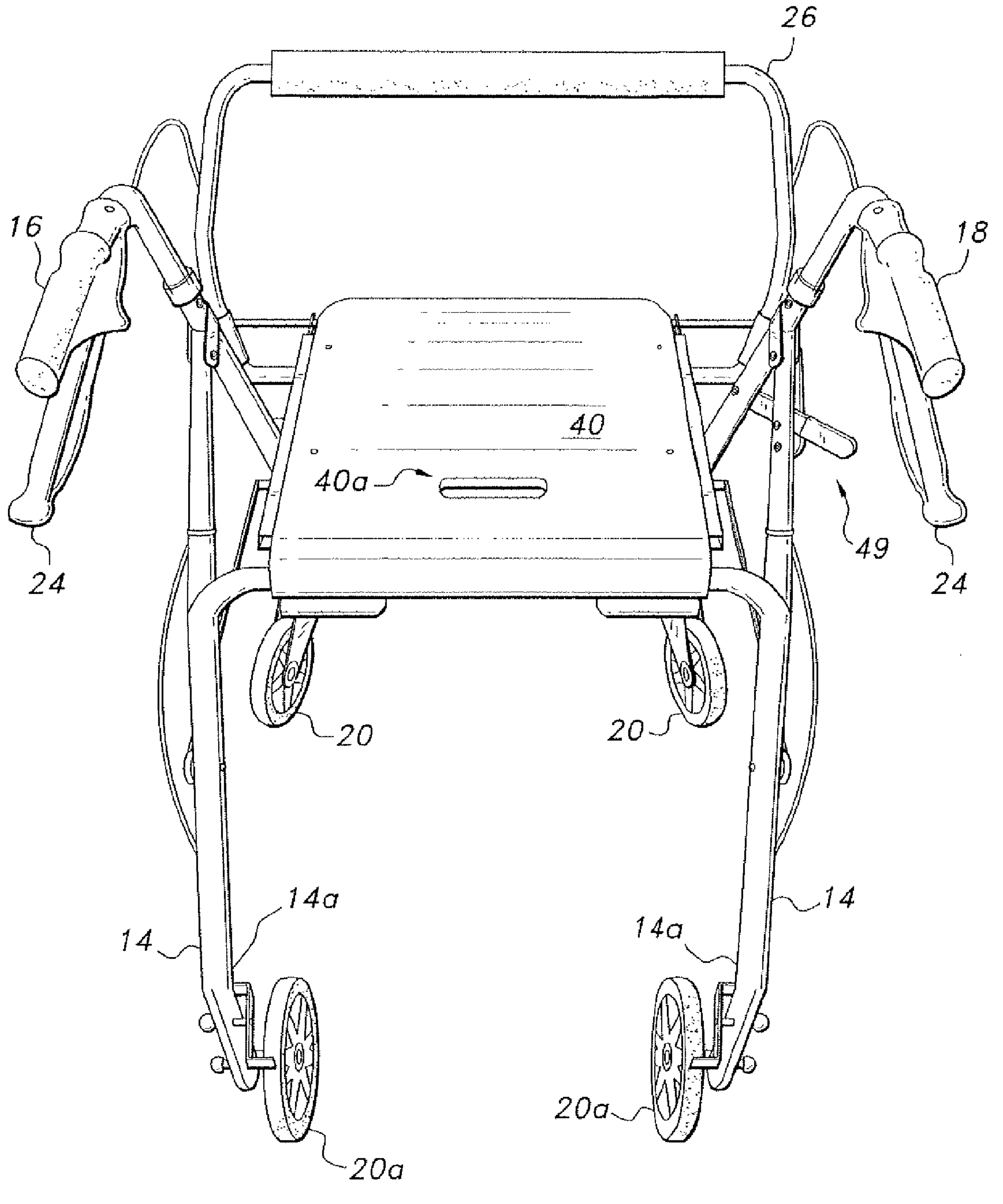
FIG. 6 is a perspective view of the shower chair/walker combination of FIG. 5, shown with the lid folded down for use as a walker.

A front cross-brace 34 is attached to front frame members 12 and is adapted to secure a seat 36 pivotally attached thereto. The seat 36 has a configuration similar to that of a split toilet seat, which split toilet seat has a gap at its front end. A rear cross-brace member 35 is attached to rear frame members 14. The front end of seat 36 is supported on rear cross-brace member 35 when the seat is pivoted to an in use or downward position. The seat design permits a caregiver to have access to the patient's entire body thereby ensuring thorough cleansing. As best seen in FIGS. 3 and 4, the appliance is easily folded for storage when desired.

In use, a patient P (shown in phantom lines) can employ the appliance as a walker or, alternatively, be transported to the shower area while seated on the appliance. The appliance and the seated patient are positioned in the shower thereby affording an opportunity for through bathing by a caregiver or the like.

In the embodiment as illustrated in FIGS. 5-9, rear casters *20a* are positioned on the inside surfaces *14a* of respective rear tubular frame members 14. This positioning permits the casters *20a* to easily clear conventional bathroom doorframes and provides for easy access and egress to and from bathrooms. Cross-brace member 35 is positioned at a height sufficient to clear the top of a commode C (conventional and for handicapped users). A lid or cover 40 is mounted to hinged lever mechanism 42 to permit the cover to pivot completely behind the seat 36 (FIG. 9), if desired. An opening 40*a* is provided in the lid whereby the lid may be grasped and pivoted as needed. The lid provides for a more aesthetically pleasing arrangement when the appliance is employed as a walker in public, and also provides a more comfortable seat for the user if needed.

Figure 7:
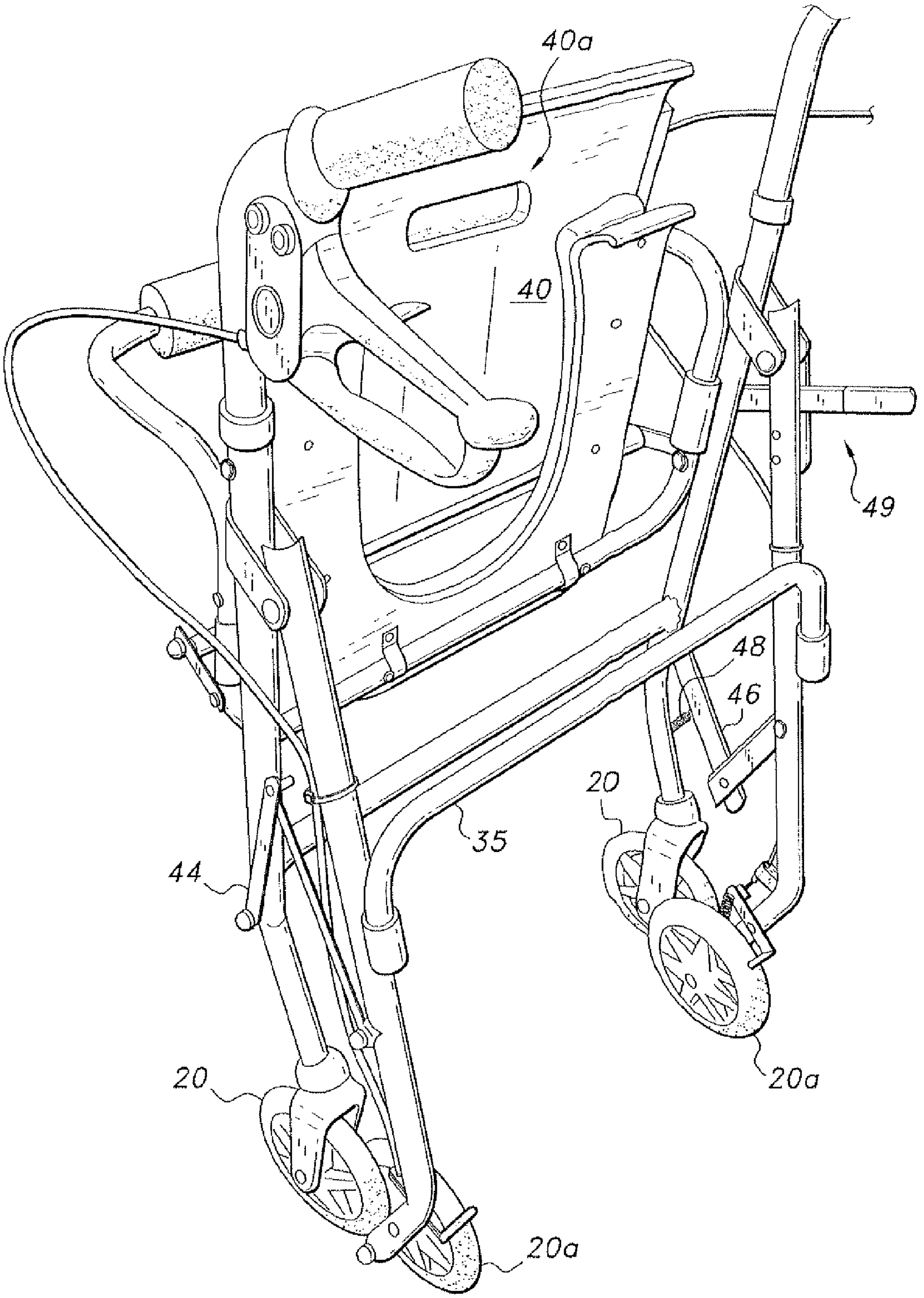
FIG. 7 is a perspective, front view of the shower chair/walker combination of FIG. 5, shown in a folded position.
Figure 8:
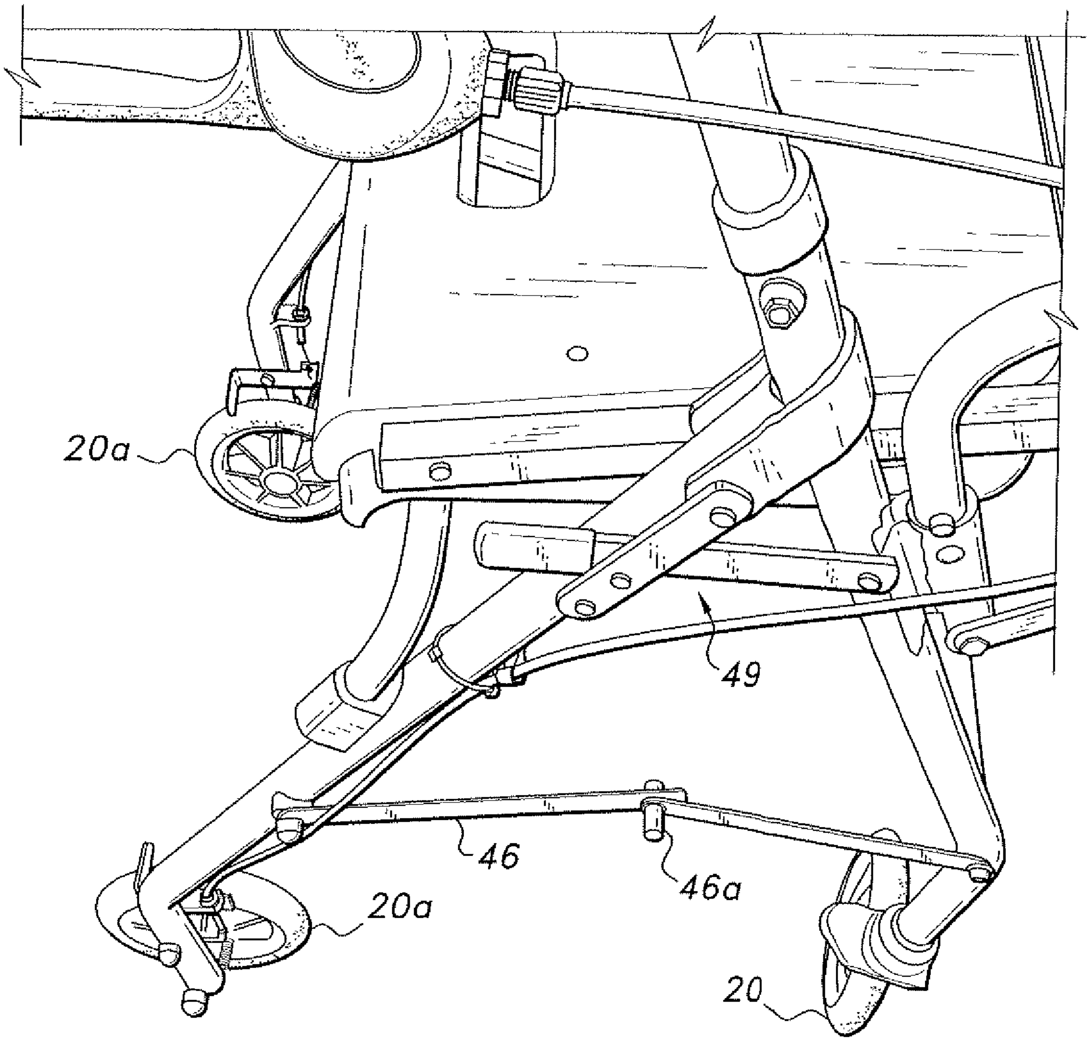
FIG. 8 is a partial perspective, side view of the shower chair/walker combination of FIG. 5, showing details of the folding bar support structure.
Figure 9:
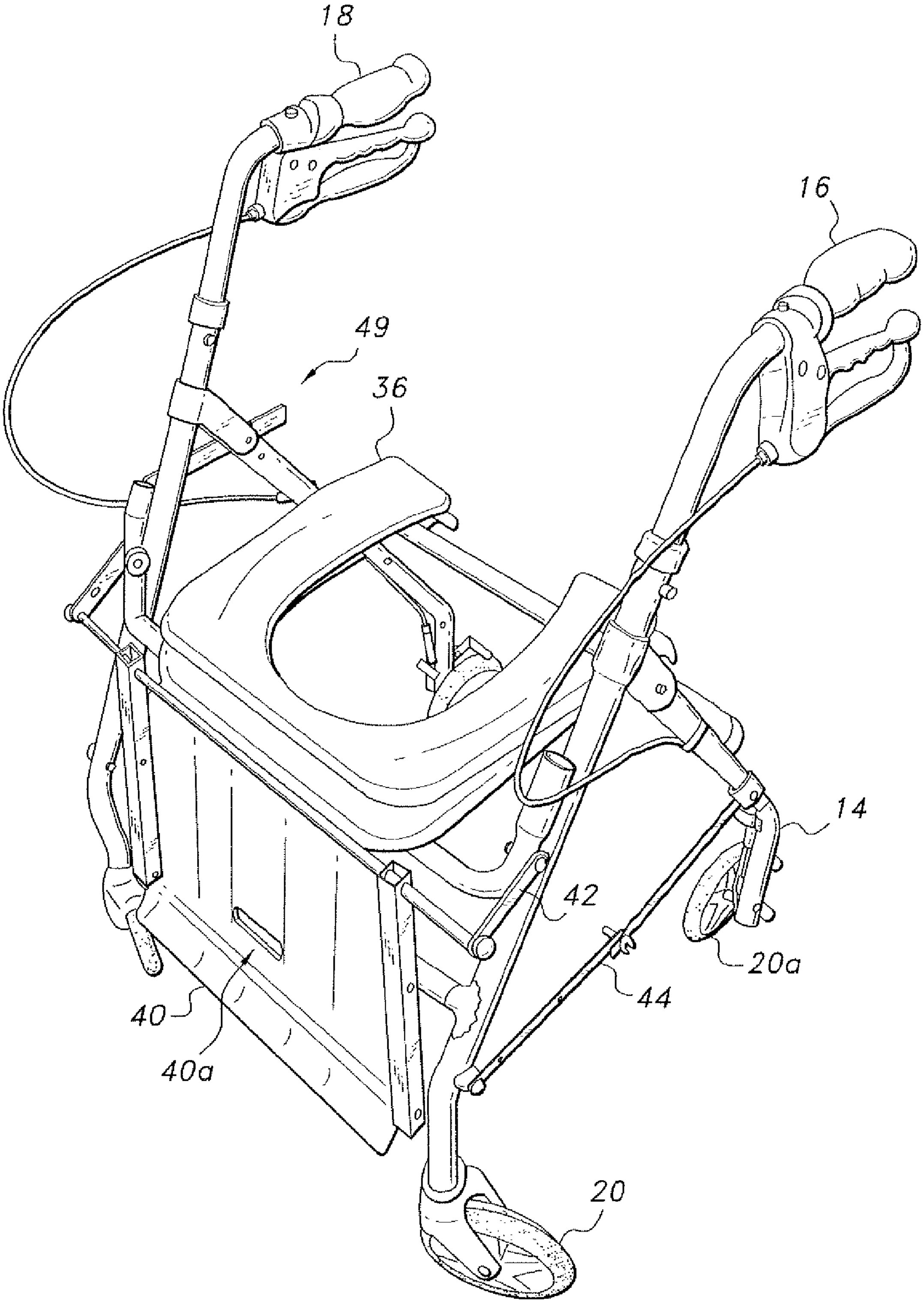
FIG. 9 is a perspective view of the shower chair/walker combination of FIG. 5, shown with the backrest detached and the lid folded back.

As best seen in FIGS. 7 and 8, folding bar support members 44 and 46 are provided with respective reversed one-way hinge structures at 44*a* and 46*a*. This arrangement allows one support member 44 to fold in an upward direction, while preventing folding in a downward direction. Simultaneously, the other support member 46 is folded in a downward direction and is prevented from folding in the upward direction. This arrangement allows the device to be easily folded with a slight upward pressure on the handles. A mechanical locking assembly 49 functions to lock the appliance in the unfolded position and allows the appliance to be lifted up to clear obstructions (curbs, steps, etc.) without folding. The handle of the safety assembly must be lifted to unlock the assembly to allow folding. This arrangement enhances safety in that it prevents an inadvertent collapse of the appliance. As shown in FIG. 7, a spring 48 is attached to member 46 and to member 12 to provide a mechanical assist to enhance folding.

It is to be understood that the present invention is not limited to the embodiment described above, but encompasses any and all embodiments within the scope of the following claims.

I claim:

1. A shower chair/walker combination, comprising:

a front frame member having lower ends;

a rear frame member pivotally attached to the front frame member, the rear frame member having lower ends, the lower ends of the rear frame member having inside surfaces;

a first pair of casters mounted on the lower ends of the front frame member;

a second pair of casters mounted on the inside surfaces of the lower end of the rear frame member;

a pair of folding bar support members connecting the front frame member to the rear frame member, each of the folding bar support members having a respective one-way pivoting hinge, whereby the folding bar support members fold in opposite directions;

a spring connecting one of the folding bar support members to the rear frame member;

braking elements positioned adjacent the second pair of casters a front cross-brace member attached to the front frame member;

a rear cross-brace member attached to the rear frame member;

a seat pivotally mounted on the front cross brace member, the seat having a front end, the seat being configured as a split toilet seat having a gap at the front end;

a lid pivotally mounted on the front frame member, the lid overlying the seat for optionally covering the seat; and a locking assembly connected to said front frame member and said rear frame member for preventing an inadvertent collapse of the shower chair/walker combination.

2. The shower chair/walker combination according to claim 1, wherein said lid has an opening therethrough, whereby said lid may be grasped for pivoting, the combination further including a pair of handles telescopically mounted on said front frame member.

3. The shower chair/walker combination according to claim 2, wherein the combination is fabricated from lightweight, rust resistant materials.

4. The shower chair/walker combination according to claim 1, further including a backrest removably attached to said front frame member.

5. The shower chair/walker combination according to claim 4, wherein said backrest is padded.

* * * * *